Oct. 13, 1942.  M. WEYMOUTH  2,298,667
COLOR TEMPERATURE METER
Filed Nov. 21, 1939
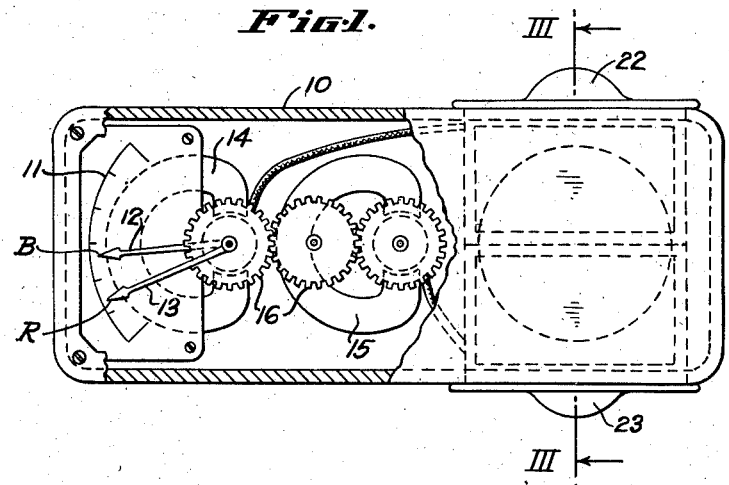
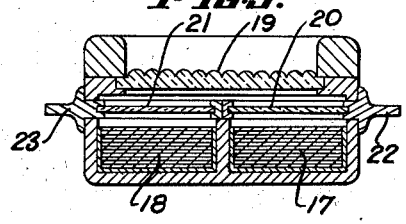
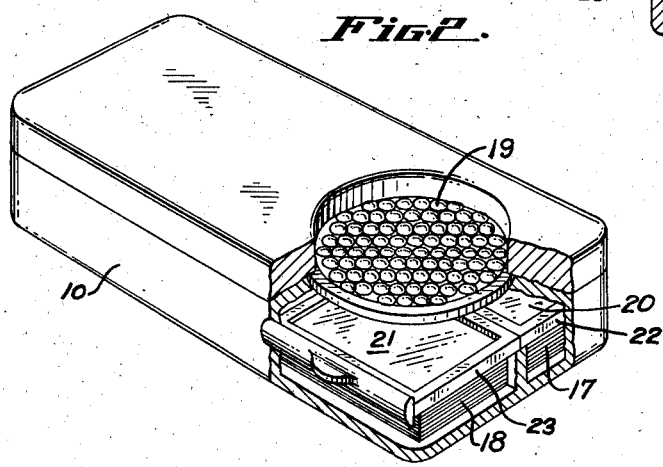
INVENTOR.
MASON WEYMOUTH
BY
ATTORNEY.

Patented Oct. 13, 1942

2,298,667

UNITED STATES PATENT OFFICE 2,298,667

COLOR TEMPERATURE METER

Mason Weymouth, San Francisco, Calif., assignor of one-fourth to William H. Atkinson, San Francisco, Calif.

Application November 21, 1939, Serial No. 305,499

5 Claims. (Cl. 88—22.5)

The present invention relates to color temperature measuring means and more particularly to a color temperature meter suitable for analyzing and determining the color quality of a source of light to be used in connection with the taking of colored pictures with color sensitive films and the like.

An object of the invention is to provide an improved color temperature meter for determining the relative color values of a source of illumination used for photographic purposes.

Another object of the invention is to provide a device for analyzing the color composition of a source of illumination in terms of the sensitivities of different light recording elements of a system of color photography.

Another object of the invention is to provide a color temperature meter for determining when the complementary extremes in the spectrum of a source of white light are in balance at a predetermined light temperature in Kelvin units.

At the present time, insofar as I am aware, the only known means for analyzing the color values of a light source for photographic purposes involves visual comparison of the light source through suitable filters with a known color. This means depends upon the eye of the user and due to the natural variations in vision and the fallibility of the human eye, the results obtained therewith are not uniform. It is, therefore, a further object of the invention to provide a photomechanical color temperature meter which will eliminate the human element and produce uniformly constant results.

For a better understanding of the invention, reference should be had to the accompanying drawing, wherein there is shown by way of illustration and not of limitation a preferred embodiment thereof.

In the drawing:

Figure 1 is a substantially full size plan view of a device constructed in accordance with the present invention, Figure 2 is a perspective view looking at the back of the device illustrated in Figure 1, and Figure 3 is a vertical sectional view taken along line III—III of Figure 1.

The need for a photomechanical color temperature meter in color photography is due to the fact that all color films or color separation plates are, for the sake of uniformity, based on some given color temperature. Consequently, in color photography some means of determining the color temperature of the light source is necessary.

Present day photographic film and plate emulsions are based for their exposures on the Kelvin unit system of color unit temperature determination, and the films are balanced to give correct rendition of color at definite color temperatures depending on the type and character of the color sensitive medium. The regular Kodachrome film manufactured by the Eastman Kodak Co. is balanced to produce a proper exposure when the color temperature of the source of illumination has a value of 5400° K. At a given day at noon in Washington, D. C., a color temperature of 5400° K. would be absolutely correct for this film. For artificial illumination the G. E. Mazda 3200° K. lamps also give the correct color value for the Eastman Type B film when the lamp is operated at its rated voltage and used within the age limitations of the lamp. While there is not much that can be done toward varying the color temperature of sunlight, it will be readily appreciated that with artificial illumination the color temperature of the light source may be varied in various ways, as for example by raising or lowering the voltage of the lamp or replacing outworn with new lamps. It is in this latter field that the present invention will find its greatest usefulness and while I shall hereinafter describe the invention and refer to values which are suitable for use with a particular type of film; namely—Kodachrome, as now manufactured by the Eastman Kodak Co., it is to be understood that the color temperature meter contemplated by this invention will be found equally useful with other types of films which may be designed for use at other color temperatures.

In the proposed color temperature meter, the meter being a photomechanical device, it is not influenced by sources of light other than that being tested, i. e., lights or colors looked at immediately before using the meter, nor is it subject to eye fatigue, as the meter depends, as stated before, purely on a mechanical device and no human element enters into the process previous to the reading of the dials. It is self-determining up to the reading of the dials by the photographer.

Reference is now made to the drawing for a detailed description of the apparatus and its mode of operation. As illustrated, the various elements which go to make up a device of the character contemplated are mounted within a relatively small portable case 10 of molded material. To facilitate assembly of the elements the case 10 is shown as in two parts, but it is to be understood that the case 10 may take many other forms. At one end of the case 10 and visible through a suitable aperture in one side thereof, as illustrated in Figure 1 of the drawing, there is a graduated scale or dial 11 with which suitable indicating pointers 12 and 13 cooperate. The pointer 12 is arranged and adapted to be controlled by an electromagnetic meter element 14 and the pointer 13 is arranged and adapted to be controlled by a similar electromagnetic meter element 15. As here illustrated, the pointers 12 and 13 are arranged one above the other so as to move about a common axis. The pointer 12 is connected directly to its meter element 14 and the pointer 13 is connected to its meter element 15 through a train of gears 16 which transmit movement produced by the meter element 15 to the pointer 13 at a 1:1 ratio.

At the other end of the case 10, as is more clearly illustrated in Figure 2 of the drawing, there are arranged two light sensitive photo-electric cells 17 and 18 which are adapted to respond to light transmitted through a light distributing lens 19 mounted in the other side of the case 10. The light distributing lens 19 is recessed and positioned so that it will, when properly pointed at a source of illumination, distribute the light from the source equally upon each of the photo-electric cells 17 and 18. Interposed between the light sensitive photo-electric cells 17 and 18 and insertable through slots provided in the sides of the case 10, there are respectively color filters 20 and 21. These color filters 20 and 21, as will hereinafter appear, being of such character that complementary parts of the spectrum will be directed upon the cells 17 and 18.

As is more clearly illustrated in Figure 3 of the drawing, the filters 20 and 21 are mounted in suitable frames 22 and 23 so that where a series of complementary filter units are provided, they may be interchanged at will to render the color temperature meter operative to indicate when the complementary parts of the visible spectrum are in proper proportion to produce a definite color temperature in Kelvin units. The photo-sensitive cells 17 and 18, as has been suggested above, should be of a type which will give equal response when exposed to a light source without the interposition of color filters. A cell which I have found to be adaptable in my device is known as the Weston Type 1 "Photronic" cell. This cell has been found to have extreme permanence and does not show any substantial deterioration in use.

When the cells 17 and 18 are properly assembled in the case 10 the cell 17 will be connected to impress its potential output on the winding of the meter element 14, and the cell 18 will be connected to impress its potential output on the winding of the meter element 15. In other words, the output of the cell 17 will influence the movements of the pointer 12 and the output of the cell 18 will operate to control the movements of the pointer 13. In order that the pointers 12 and 13 be rendered sensitive to indicate when the complementary parts of the spectrum are in proper proportion to indicate a predetermined color temperature in Kelvin units, the color filters 20 and 21 will be so chosen that the intensities of colored light transmitted thereby will be equal or in a known relation to each other. This will result in potentials being developed in cells 17 and 18 which will move the pointers 12 and 13 to a point along the scale 11 where the pointers, when properly adjusted with respect to the filters used, will be superimposed in coincidence with each other. From this it will be seen that by selecting color filters having definite wave lengths and properly adjusting the pointers 12 and 13 of the meter elements 14 and 15, it will be possible to determine when the complementary parts of the spectrum are in proper proportion to conform to the requirements of a particular photo-sensitive material, such as a color film or plate.

As a practical illustration, I have found that when the filter 20 is of a character to transmit blue-violet light at a wave length of approximately 450 millimicrons, and the filter 21 is adapted to transmit red-orange light rays at a wave length of approximately 640 millimicrons, substantially equal potentials will result in the cells 17 and 18 and as a result the pointers 12 and 13 will be moved into coincidence with each other when the color temperature of the light source is substantially 3200° Kelvin. Under these conditions, with the filters 20 and 21 matched in this manner, if the total intensity of the light source is raised or lowered, but the color temperature remains the same, the pointers 12 and 13 may move up or down the scale 11, but they will still remain in coincidence as their respective cells 17 and 18 will receive their relative proportion of the light.

While I have hereinabove referred to filters adapted to transmit light within certain definite wave lengths, it will be understood that these values are given only by way of example and that filters transmitting light of different wave lengths may be used in accordance with this invention. In the selection of these filters, however, it will be desirable to provide filters having a narrow band of transmission. This will eliminate the middle range of the light spectrum as well as those light waves outside of the range of sensitivity of the color film being used. The bands of light outside of the range of the film must be eliminated as increased intensities in these ranges will give false readings. By the same token, the limitation of the wave lengths of light within the range of the film to narrow bands is necessary in order to give extreme sensitivity. For example, if the blue-violet filter 20 is adapted to transmit light at wave lengths of from 450 to 550 millimicrons, the response of the cell 17 will drop off as the light gets warmer, but not nearly as fast as it would if the band of transmission of the filter 21 were limited to a narrow band of wave lengths between 450 and 460 millimicrons.

Since the spectral distribution of a perfect source of white light is defined by its color temperature, it will be readily seen that in the case of artificial illumination the above described color temperature meter may be used by a photographer to control his source of illumination for color. This is important in order that a proper color balance be obtained in the finished picture. If the readings show the color values of the source of illumination to be different from those for which a particular film is balanced, steps can be taken to compensate for this by raising or lowering the voltage of the lamps or changing their character to provide a proper color balance in the source of illumination. If the Eastman Kodachrome film referred to above is used and the lamps are operated at color temperatures below 3200° K. the picture will appear warm in hue, while if the lamps are run at higher values than 3200° K., the results will be bluish in color or cold. The same will also apply to other color films and to the three color exposure cameras, if they are designed to give balance at a definite color temperature.

In operation, when a device constructed as above described is held up to a light source so that the light thereof will be projected through the lens 19 and upon the filters 20 and 21, the response of the photo-electric cells 17 and 18 will be proportional to the intensity of the light transmitted through their respective filters. If the filters 20 and 21 are so chosen as to give equal transmission at wave lengths corresponding to the ends of the spectrum for which they are designed, the potentials developed by the photo-electric cells 17 and 18 will be equal and the meter elements 14 and 15 will cause the pointers 12 and 13 to move to a point along the dial 11 where they will be in coincidence. This, as has been previously suggested, will indicate that the light source has a color temperature of 3200° Kelvin. For example, with a light source of 100 candle power having a color temperature of 3200° K., the light passing through the filter units will be equal in intensity and consequently the pointers 12 and 13 will be similarly affected. Now, should the color temperature drop to a warmer hue, for example—2500° K., and the intensity of the light source remain at 100 candle power, the pointer 13, which is responsive to the photo-electric cell 18 located beneath the red-orange filter 21, will remain in its original position, while the pointer 12, which is responsive to the photo-electric cell 17 located beneath the blue-violet filter 20, will drop back due to the decrease in blue light. This will be true even though the intensity of light reaching the surface of each of the filters 20 and 21 remains the same, as more light will pass through the red-orange filter 21 than the blue-violet filter 20 as the higher percentage of the total light will be red. However, when the source of light is brought back to a color temperature of 3200° K. and the intensity is kept at 100 candle power, the pointer 12 will move up to a point in coincidence with the pointer 13 as the proportion of the blue light is increased.

While I have for the sake of clearness and in order to disclose the invention so that the same can be readily understood, described and illustrated a specific device and arrangement, I desire to have it understood that this invention is not limited to the specific means disclosed, but may be embodied in other ways that will suggest themselves to persons skilled in the art. All such changes as come within the scope of the appended claims are to be considered as part of this invention.

Having thus described my invention, what I claim and desire to secure by Letters Patent is:

1. In a color temperature meter, the combination of a photo-electric cell adapted to respond to the intensity of light produced by a source of illumination at one point in its spectrum, a second photo-electric cell adapted to respond to the intensity of light at another and complementary point in the spectrum of said source of illumination, a single indicating dial, a meter element connected to and responsive to the output of said first photo-electric cell having a pointer movable over said dial, a second meter element connected to and responsive to the output of said second photo-electric cell having a pointer also movable over said single indicating dial, and filter units associated with said photo-electric cells adapted to limit the response of the respective photo-electric cells to the color values at the different complementary points in the spectrum of said light source, said filter units being so chosen that for a given color temperature they will transmit light from said complementary points in the spectrum of said light source in equal proportions, whereby the pointers of said meter elements will move to a common point upon said indicating dial when the color temperature of the light source corresponds to said given color temperature.

2. In a color temperature meter for determining when a light source is at a predetermined color temperature, the combination of a photo-electric cell having a color filter associated therewith for limiting its response to one point in the spectrum of said source of illumination, a second photo-electric cell having a color filter associated therewith for limiting its response to another and complementary point in the spectrum of said source of illumination, the respective filters of said cells being adapted to transmit light of equal intensity to said cells when said predetermined color temperature prevails at said source of illumination, a separate meter element connected to and responsive to the output of each of said photo-electric cells, a single indicating dial, and independently movable pointers controlled respectively by said separate meter elements arranged and adapted to move over said single indicating dial, whereby any deviation in the color value at either of said points in the spectrum of said source of illumination from the desired color temperature will be indicated by the displacement of said pointers from each other upon said dial.

3. In a device for determining the color temperature of a light source of known intensity, the combination of a pair of photo-electric cells adapted and arranged to be equally exposed to light from a source of illumination, an independent meter element connected to and responsive to each of said photo-electric cells, said meter elements having pointers movable in proportion to the intensity of light reaching said photo-electric cells from said source of illumination, and a filter unit associated with each of said photo-electric cells adapted to limit the response of said cells to the color values at different complementary points in the spectrum of said light source, said filter units being so chosen that for a given color temperature they will transmit light of equal intensity from said different complementary points in the spectrum of said light source, whereby the pointers of said meter elements will move in equal amounts when the color temperature of said light source corresponds to the given color temperature for which said filter units are chosen.

4. In a color temperature analyzing means for determining when the color composition of a source of illumination is proper for a given light recording emulsion, the combination of a pair of light sensitive systems each including a photo-electric cell and a meter element responsive thereto, said photo-electric cells being arranged and adapted to be simultaneously exposed to a source of illumination the color temperature of which is to be determined, a filter unit associated with each of the photo-electric cells of said light sensitive systems adapted to limit the response of each of said cells to the color values at different complementary points in the spectrum of said source of illumination, said filter units being so chosen that for a given color temperature they will transmit light of equal intensity from said different complementary points in the spectrum of said source of illumination and means controlled by said meter elements for indicating when the responses of said cells are of equal magnitude.

5. In a color temperature meter, the combination of two photo-electric cells adapted and arranged to be simultaneously exposed to the light produced by a source of illumination, a separate meter element for each of said cells and responsive to the output thereof, pointers separately controlled by said separate meter elements adapted and arranged to move over a single indicating dial, a light transmitting filter associated with each of said photo-electric cells for limiting the response of said photo-electric cells respectively to the light at different complementary points in the spectrum of said source of illumination, said filters being so chosen that light of equal intensity will be transmitted to said photo-electric cells when a predetermined color temperature obtains in said source of illumination, and means for supporting said pointers so that they will move equal distances and into coincidence over said indicating dial when the color temperature of said source of illumination corresponds to said predetermined color temperature.

MASON WEYMOUTH.